Figure 5:
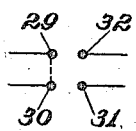

J. H. HUNT.
HYDROCARBON MOTOR.
APPLICATION FILED MAR. 7, 1914.
1,148,843.
Patented Aug. 3, 1915.
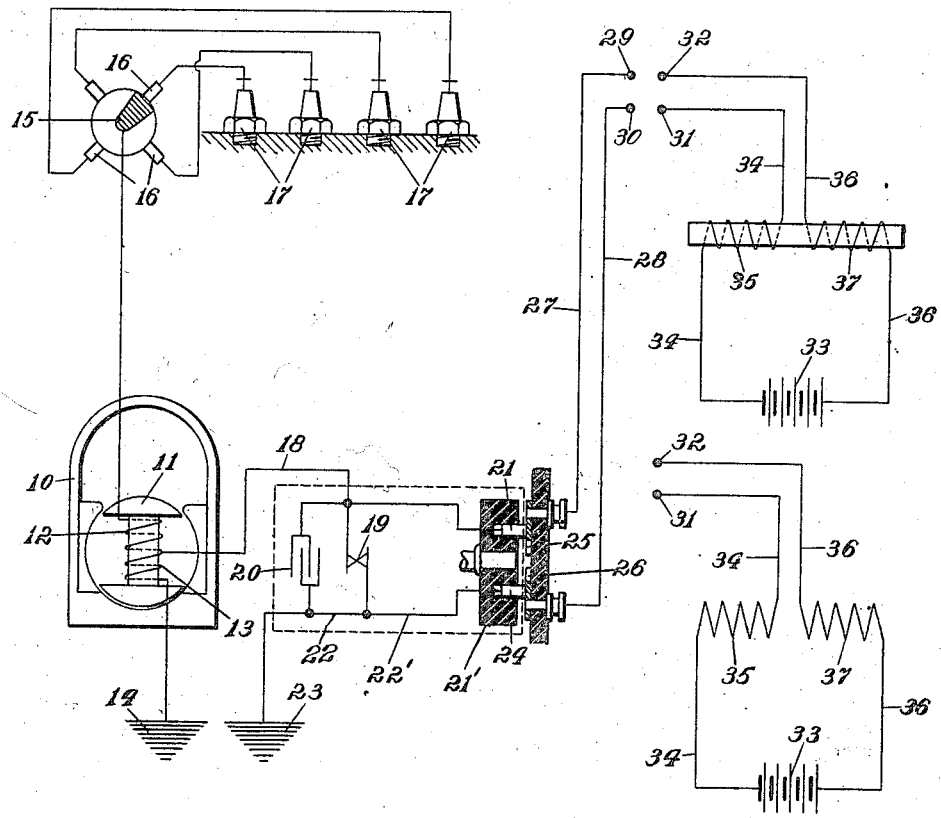
Fig.1.
Fig.3. 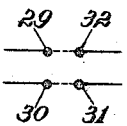 Fig.4. 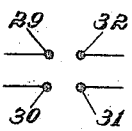 Fig.2.

Witnesses.
Inventor.
J. H. Hunt
by Foster, Freeman, Watson & Coit
Attorneys

UNITED STATES PATENT OFFICE.

JOHN H. HUNT, OF DAYTON, OHIO, ASSIGNOR TO PACKARD MOTOR CAR COMPANY, OF DETROIT, MICHIGAN, A CORPORATION OF MICHIGAN.

HYDROCARBON-MOTOR.

1,148,843.   Specification of Letters Patent.   Patented Aug. 3, 1915.

Application filed March 7, 1914. Serial No. 823,226.

*To all whom it may concern:*

Be it known that I, JOHN H. HUNT, a citizen of the United States, residing at Dayton, Montgomery county, Ohio, have invented certain new and useful Improvements in Hydrocarbon-Motors, of which the following is a specification.

This invention relates to improvements in hydrocarbon motors and more particularly to ignition systems for hydrocarbon motors.

The invention is adapted for use in various types and combinations of ignition systems.

In the embodiment of the invention herein shown, the ignition system includes two separate sources of electric current, alternating and direct respectively. A magneto of the well known high tension type supplies the alternating current and a battery supplies the direct current, although a direct current generator would answer the latter purpose.

In combining the magneto and battery currents as herein shown, a single transformer apparatus and a single interrupter are used for both circuits; and a polarity changing device operating in synchronism with the magneto sends the battery current through the transformer to assist the magneto current. As one side of the transformer primary coil is always grounded it will be seen that one side or the other of the battery will always be grounded through said coil so long as the battery circuit is connected in the system.

While the ignition system herein shown is not necessarily limited in use to motors for motor vehicles, yet it is particularly adapted for such use, and in most cases the direct current source, usually a battery, is also used for lighting and starting purposes which require considerable wiring on the vehicle, and this wiring is likely to develop grounds or partial grounds that are difficult to locate. With the battery constantly grounded on one side or the other through the transformer, as above pointed out, it is evident that an intermittent short circuit is obtained if one side of the battery wiring is any where accidentally grounded. This will of course result in every other one of the motor cylinders missing fire until the accidental ground (in a lamp circuit for instance) is located and eliminated, and should the motor stop with the polarity changing device in a certain one of its two positions the complete short circuit would soon exhaust the battery. Also in such use of the invention, it will be seen that there may be a greater heating value to the direct current source, either by reason of its continuing character as distinguished from the momentary character of the magneto current or by reason of its being of higher voltage for a particular use, and when the transformer apparatus of the usual type of magneto is used in this connection, some of its parts may not be made heavy enough to withstand for any length of time a current of the heating value or voltage of the direct current source. Therefore such short circuiting of the battery as is above pointed out would be liable to injuriously heat the transformer circuits and connections.

The salient object of the present invention is to obviate or minimize these troubles, and with this end in view a resistance or resistance and inductance unit is placed in each of the conductors leading from the battery, these units or coils possessing sufficient resistance and inductance for the purposes required.

The invention is illustrated in the accompanying drawings, which form a part of the specification, and in which:—

Figure 1 is a diagrammatic view of an ignition system involving this invention; Fig. 2 indicates another form of resistance unit that may be used; and Figs. 3, 4 and 5 indicate different switch connections.

Referring to the drawings, 10 indicates diagrammatically a magneto of the high tension type having a revolving armature 11 which in this instance constitutes a transformer having a high tension or secondary coil 12 and a low tension or primary coil 13. As shown, the primary and secondary coils of the transformer are identical with the magneto armature coil, but it will be understood that the several functions of separate coils are retained and both the combined coil and the separate coils are within the scope of this description. The coils 12 and 13 have one terminal connected with a ground 14 and the other terminal of the coil 12 is connected with a distributer 15, preferably geared to the armature shaft, and successively contacting with brushes 16 which are connected with the respective spark plugs 17 on the motor. The other terminal of the primary coil 13 is connected by a conductor 18, with one terminal of an interrupter or breaker 19. The conductor 18 is also connected with one side of a condenser 20, and with the brush 21, on the rotating part 21' of a polarity changing device which may be carried by the armature 11. The other terminal of the interrupter 19 has connected therewith a conductor 22 which is grounded at 23 and connects with the other terminal of the condenser 20. The other brush 24 on the revolving part 21' of the polarity changing device is grounded as at 22'. The brushes 21 and 24 are adapted to successively engage segmental contacts 25 and 26 on the stationary part 25' of said device.

The segments 25 and 26 have connected therewith conductors 27 and 28, respectively, these conductors leading to contacts 29 and 30 of a switch which is also provided with contacts 31 and 32.

A suitable source of direct current such as a battery 33 has one terminal connected with the contact 31 through a conductor 34 in which there is a resistance unit 35, shown in Fig. 1 as a resistance and inductance coil and in Fig. 2 as a simple resistance coil, and the other terminal connected with the contact 32 through a conductor 36 in which there is a resistance or resistance and inductance unit 37, which is shown in Fig. 1 as similar to but need not necessarily be a part of, the unit 35. In Fig. 2 the unit 35 is shown as a simple resistance and the unit 37 as a resistance and inductance unit. If units of the inductance type are used on both sides of the battery and the coils are wound on the same magnetic core as shown in Fig. 1, a greater inductive effect is obtained than when separate coils of the same resistance are employed.

When the parts are arranged as shown in Fig. 1, the battery may be used as the sources of ignition by connecting the contacts 29 and 32 and the contacts 30 and 31, as shown in Fig. 3. When the interrupter 19 is closed, the current will then flow from the battery through the conductor 36 and coil 37, the segment 25, brush 21, through the interrupter 19 to the ground 23, returning from ground 22' through brush 24, segment 26, conductors 28 and 34 and coil 35 to the battery. When the contacts of the interrupter 19 separate this current rushes via conductor 18 through the primary winding 13 where it is transformed and passes from the winding 12 and is delivered to the spark plugs as a spark. As the polarity of the winding 13 reverses with each half revolution, it is clear that the battery through the polarity changing device is always connected to that terminal of the coil 13 having at that instant the same polarity.

If the motor which usually drives the magneto, stops with the brushes 21 and 24 in the position shown in the drawing, current will tend to flow from the battery as just described, and if a ground accidentally occurs on either side of the battery, it will be obvious that the current will be compelled to flow through at least one of these coils 35, 37, and, therefore, a dead ground or short circuit will be avoided.

When it is desired to use magneto ignition only the contacts of the switch are disconnected, as shown in Fig. 4, and when it is desired to interrupt the ignition entirely the contacts 29 and 30 are connected, as shown in Fig. 5.

A specific embodiment of the invention has been described in detail, and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:—

1. In an ignition system for hydrocarbon motors, a source of direct current, a transformer apparatus, positive and negative conductors between said source and said transformer apparatus, an interrupter mechanism, and a resistance unit in each of said conductors.

2. In an ignition system for hydrocarbon motors, a source of direct current, a transformer apparatus, positive and negative conductors between said source and said transformer apparatus, an interrupter mechanism, a resistance unit in one of said conductors, and a resistance and inductance unit in the other of said conductors.

3. In an ignition system for hydrocarbon motors, a source of direct current, a transformer apparatus, positive and negative conductors between said source and said transformer apparatus, an interrupter mechanism, and a resistance and inductance unit in each of said conductors.

4. In an ignition system for hydrocarbon motors, a source of direct current, a transformer apparatus, positive and negative conductors between said source and said transformer apparatus, an interrupter mechanism, and a resistance and inductance coil having a divided winding, part of said winding being arranged in each of said conductors.

5. In an ignition system for hydrocarbon motors, a source of direct current, a transformer apparatus, positive and negative conductors between said source and said transformer apparatus, an interrupter mechanism, and a resistance and inductance coil having its winding divided into two equal parts, one of said parts being arranged in each of said conductors.

6. In an ignition system for hydrocarbon motors, a source of direct current, a source of alternating current, a transformer apparatus, connections from said sources to said transformer, an interrupter mechanism, a polarity changing device in the connections from said direct source to said transformer, and a resistance coil in the connections from said direct current source and on either side thereof.

7. In an ignition system for hydrocarbon motors, a source of direct current, a source of alternating current, a transformer apparatus, connections from said sources to said transformer, an interrupter mechanism, a polarity changing device in the connections from said direct current source to said transformer, and a resistance and inductance coil having a divided winding, a separate part of said winding being arranged on either side of said direct current source in the connections therefrom to said transformer.

8. In an ignition system for hydrocarbon motors, a source of direct current, a source of alternating current, a transformer apparatus, connections from said sources to said transformer, an interrupter mechanism, a polarity changing device in the connections from said direct current source to said transformer, and a resistance and inductance coil having a divided winding, said polarity changing device revolving in synchronism with the alternating current source, a separate part of said winding being arranged on either side of said direct current source in the connections therefrom to said transformer.

In testimony whereof I affix my signature in presence of two witnesses.

JOHN H. HUNT.

Witnesses:
E. H. BAYLISS,
W. H. WINDHAM.

Copies of this trade-mark may be obtained for five cents each, by addressing the "Commissioner of Patents, Washington, D. C."